R. H. BROWN.
COLLAPSIBLE SULKY.
APPLICATION FILED OCT. 12, 1911.

1,074,349.

Patented Sept. 30, 1913.

Witnesses:
G. W. Dmarus Jr.
R. Burkhardt.

Inventor:
Rhinehardt H. Brown,
By: John Howard McElroy,
his Attys.

R. H. BROWN.
COLLAPSIBLE SULKY.
APPLICATION FILED OCT. 12, 1911.

1,074,349.

Patented Sept. 30, 1913.

UNITED STATES PATENT OFFICE.

RHINEHARDT H. BROWN, OF CHICAGO, ILLINOIS.

COLLAPSIBLE SULKY.

1,074,349.  Specification of Letters Patent.  Patented Sept. 30, 1913.

Application filed October 12, 1911. Serial No. 654,375.

*To all whom it may concern:*

Be it known that I, RHINEHARDT H. BROWN, a citizen of the United States, and a resident of Chicago, in the county of Cook and State of Illinois, have invented certain new and useful Improvements in Collapsible Sulkies, of which the following is a full, clear, and exact specification.

My invention is concerned with baby carriages of the sulky or two-wheeled type, and is designed to produce such a sulky that can be quickly collapsed to fold the wheels and their supporting frames inward beneath the seat, the back rest upon the seat, the foot rest backward beneath the seat, and the tongue backward over the back rest, so as to produce a compact, collapsed structure that can be conveniently carried hanging down by the side.

My invention is further designed to produce such a vehicle in which the wheels and their supporting frames will be folded inward and the foot rest rearward automatically as the back rest is swung forward and downward on the seat.

My invention is also concerned with a novel tongue mechanism adapted to collapsible sulkies generally, in which the tongue is pivoted in the forward end of the main frame, so that it can be folded back along the axis of said main frame over the collapsed back-rest frame, and locked in this position to hold all the parts in their collapsed position, when it is to be carried by hand.

To these ends, my invention is embodied in a sulky containing certain novel combinations of elements, which will be fully described in the body of the specification and particularly pointed out in the claims.

To illustrate my invention, I have annexed hereto three sheets of drawings, in which the same reference characters are used to designate identical parts in all the figures, of which,—

Figure 1:
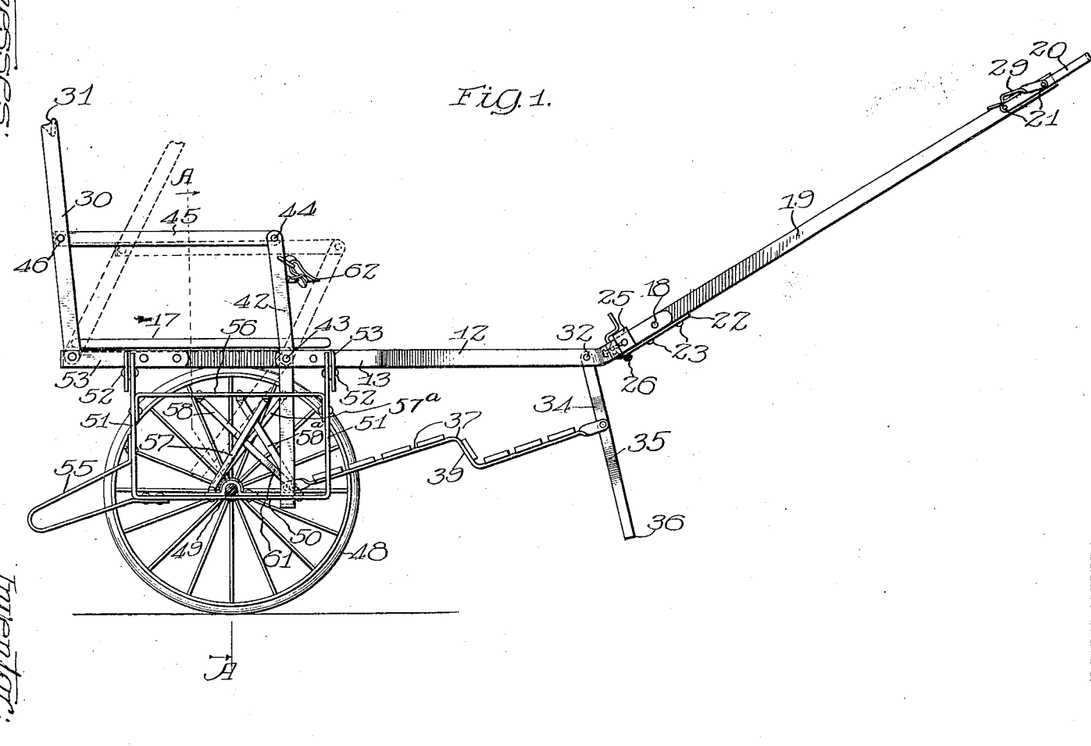
Figure 1 is a side elevation of the sulky in its non-collapsed position and ready for use, with the near wheel omitted.
Figure 2:
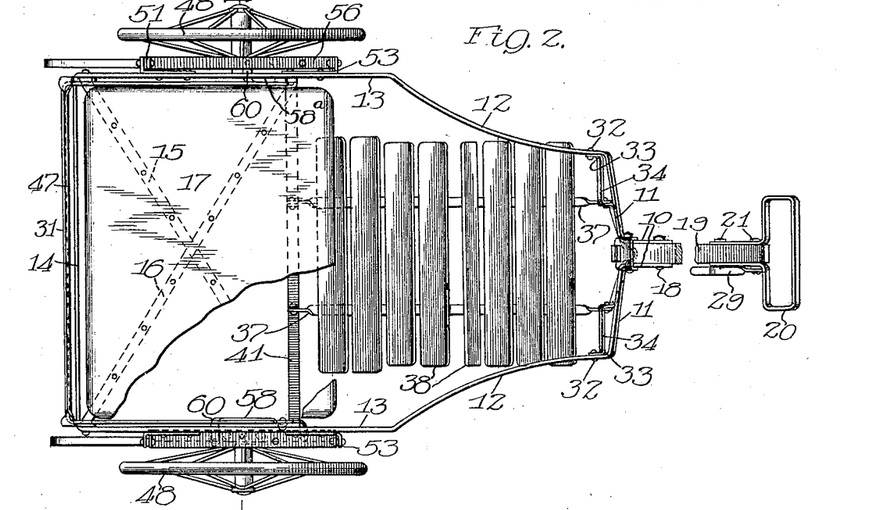
Fig. 2 is a top plan view of the same, with a portion of the tongue and seat broken out.
Figure 3:
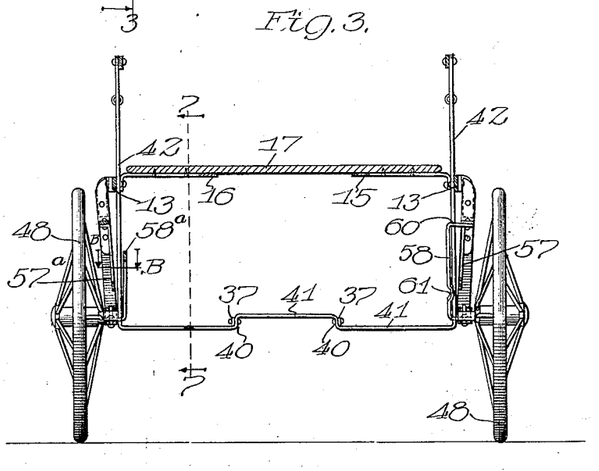
Fig. 3 is a vertical section on the line A—A of Fig. 1.
Figure 4:
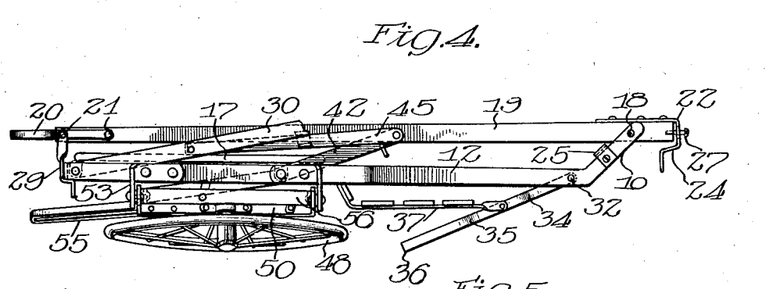
Fig. 4 is a side elevation of the sulky in its collapsed position.

The basis of the sulky, *i. e.*, the part which is not moved in the collapsing, is a horizontal main or seat-frame, which, as best seen in Figs. 1, 2 and 4, preferably consists of a metal bar having parallel ends 10 which approach closely enough to form a pivotal support for the tongue, which will be described later on. From these end portions 10 are the two sharply diverging portions 11 which form the front end of the frame, and these are succeeded by the less diverging and curved portions 12, which merge into the straight parallel portions 13 which are connected by the rear portion 14. Secured to the seat frame, by suitable rivets on the inner side thereof, are diagonal brace bars 15 and 16, best shown in Fig. 2, where their position beneath the wooden seat-plate 17, to which they are riveted, is shown in dotted lines.

Figures 5, 6:
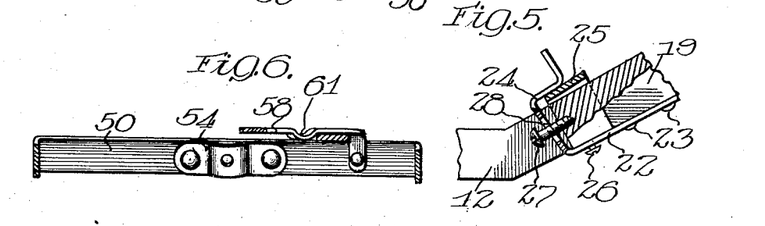
Fig. 5 is an enlarged detail through the center of the pivoted end of the tongue, showing the connections by which it is locked in the opened position shown in Fig. 1.
Fig. 6 is an enlarged detail in section on the line B—B of Fig. 3, showing the construction by which the wheel frames are locked in their opened position.

Between the ends 10 is pivoted at 18 the tongue 19, which preferably consists of a wooden bar provided at its outer end with the metallic handle 20, which may be of any desired shape, and is shown as secured thereto by bolts 21. The inner end of the tongue has secured thereto the catch member 22, which, as best seen in Fig. 5, is firmly secured by screws 23, and which has the bent-over end forming the catch shoulder 24, which is adapted to catch over the U-shaped connecting piece 25 riveted to the sides of the ends 10 of the seat frame. The catch member 22, being made of spring metal, can be sprung into and out of engaging position with the upper surface of the piece 25 to lock the tongue 19 in its extended position. To permit the necessary movement of the free end of the catch member 22, the screw 26 is only partially screwed in, leaving some play at that end, and the screw 27 is screwed into the end of the tongue 19 through a slightly elongated slot 28 in the bottom of the U-shaped portion of the catch member 22. The tongue 19, preferably, also has pivoted to the outer end thereof, on one of the bolts 21, the catch member 29, which, when the parts are collapsed as shown in Fig. 4, is adapted to be swung into position to engage the portion 14 of the seat frame and hold the parts in their collapsed position.

The back-rest frame is likewise preferably made of a single metal bar, the ends of which are pivoted to the portions 13 of the seat frame adjacent the portion 14, upon the rivets which connect the adjacent ends of the brace bars 15 and 16 with the seat frame. The vertical portions 30 of this bar are connected by the horizontal portion 31, the bar being twisted where the portions 30 join the portion 31 so as to bring the portion 31 into a vertical plane, thus broadening the surface presented to the back of the child in the sulky. A substantially vertical stop frame or standard is pivoted at its ends, at 32, to the portions 12 of the horizontal seat-frame, and it also is preferably constructed of a single metal bar which has vertical portions 33 connected by short horizontal portions 34 and the generally converging portions 35, the rounded bottom portion 36 of which forms the stop to rest on the ground. Pivoted to the substantially vertical portions of the converging portions 35 of the stop frame are two foot-rest bars 37, which have secured thereon slats 38, which are preferably of wood, and which, together with the bars 37, go to make up the foot rest. The bars 37 are preferably provided with the vertical offset portion 39, and they are pivoted at their rear ends to offsets 40 in the horizontal bottom 41 of the U-shaped vertical arm-frame, which also is preferably made of a single bar of metal bent into the shape shown. The vertical arms 42 are pivoted to the portions 13 of the horizontal seat-frame at 43, and they have pivoted to their upper ends at 44 the arm portions 45 of the U-shaped frame, which is preferably made of a single bar of metal, and which is pivoted at 46 near the bends to the vertical portions 30 of the back-rest frame. The connecting portion 47 of the horizontal arm-frame forms a portion of the back rest.

It will be noted that the structure thus far described constitutes a pair of lazy tongs with transverse connections, so that by shoving forward on the bar 31 and rearward on the stop at 36, the lazy tongs will be folded to bring the members into the collapsed position shown in Fig. 4. In operation, it is not necessary to take hold of the stop at 36, as a pull on the back-rest frame is sufficient to collapse the parts forward to the position shown in Fig. 4, and when the tongue 19 is swung forward and the catch engaged with the portion 14 of the horizontal seat-frame, the tongue engages the portion 31 of the back-rest frame and springs it inward, thus producing a tension on the catch 29 in its engagement with the portion 14, thus preventing the catch from slipping out of position. When the catch is released, the tongue flies up into position, so that by grasping the tongue and the portion 31 of the back rest, a single motion swings the parts into their opened position.

Figures 7, 8, 9:
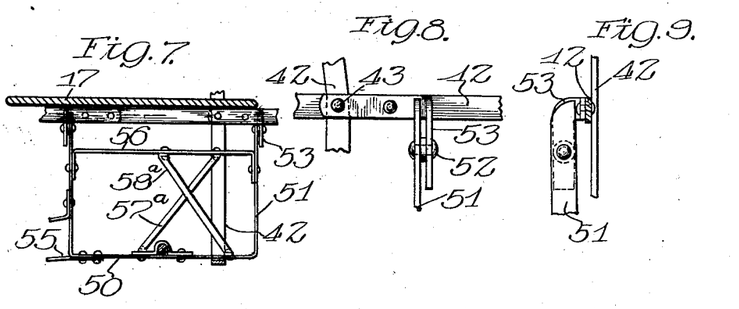
Fig. 7 is a side elevation of the left-hand wheel-frame, showing how it differs from the right-hand frame seen in Fig. 1.
Figs. 8 and 9 are enlarged details showing how the wheel frames are pivoted to the seat frame.

The wheels 48, which may be of any desired construction, but which are preferably of the customary wire-spoke and rubber-tire type, are mounted on the axle studs 49, which project outward from the horizontal lower portions 50 of the rectangular wheel-supporting frames, the vertical portions 51 of which are pivoted at 52 to the brackets 53 secured to and extending downwardly from the portions 13 of the seat frame. The axles 49 are conveniently secured in place by clips 54, best shown in Fig. 6, secured on the upper surface of the portions 50 of the wheel-supporting frames. These frames are preferably provided with back stops 55, which are made of strips of metal of the shape shown, and bolted to the bottoms 50 and the sides 51 of the wheel-supporting frames. The vertical portions 51 are connected near their upper ends by the horizontal brace bar 56, which has down-turned ends riveted thereto in a manner which will be readily apparent. The portions 50 and 56 in the right-hand wheel frame, seen in front in Fig. 1, are connected by two bars 57 and 58, while the similar bars 57$^a$ and 58$^a$ in the left-hand frame, seen in Fig. 7, are set at the different angles shown, the bars in both frames being securely riveted in place. The bars 58 and 58$^a$ are provided with offsets 60, which are adapted to be engaged by the lower portions of the vertical portions 42 of the vertical arm frame during the collapsing movement, and when this engagement occurs, the wheel frames are folded underneath the seat frame. The bars 58 and 58$^a$ are set at different angles so that one will be engaged before the other, so that the offset 60 in the bar 58$^a$ will be engaged in advance of the offset in the bar 58, thus folding the left-hand wheel inside of the right-hand wheel. The inner surfaces of the bars 57 and 57$^a$ are engaged by the outer surfaces of the lower portions of the bars 42, as the sulky is opened, and being set in the different positions shown, the bar 57 is engaged first and the right-hand wheel frame is opened out in advance of the left-hand wheel frame.

An important feature of my invention is a lug or offset 61 which is formed in the bar 58 in the proper position to engage the lower portion of the vertical bar 42 as it swings to and from the collapsing position. The bar 42 as it engages the offset 61 causes one or both of said bars to spring so that the bar 42 can pass the offset 61, and when it passes it, both bars spring back, thus locking the parts in their opened position.

The customary strap 62 may be provided and connected by snap hooks with the portions 42 of the vertical arm frame.

The operation of the complete device will now be readily apparent.

Supposing that the parts are extended or opened, as shown in Fig. 1, the portion 31 of the back-rest frame is grasped and swung forward, and the lazy-tong connections heretofore described cause the foot rest to be swung backward and upward beneath the seat, while the back rest is swung down on the seat and the front stop is swung upward beneath the foot rest. At the same time, the wheel frames are swung inward and upward beneath the foot rest and the seat. When this collapsing movement is completed, the catch member 22 is operated to release the tongue, which is then swung down on the spring piece 31 and the catch 29 engaged with the portion 14 of the horizontal seat-frame. The sulky is now locked in its collapsed position and can be readily carried hanging down at one side by means of the handle 20. When it is to be used, the catch 29 is released, the bar 31 grasped, and the structure swung out into its opened position and locked there automatically by a single movement.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art. For instance, while I have shown the main or horizontal seat-frame member as constructed of a single strip of metal bent into the shape shown, it will be obvious that it might be built up of several pieces or materials, and that its shape might be changed, provided that it is adapted to have the various elements enumerated in the claims, such as the tongue, standard, vertical arm-frame, back-rest frame, and wheel-frame pivotally connected thereto. Also the standard pivoted to the forward portion of the seat-frame and connected to the vertical frame, also pivoted to the seat-frame, might have a different shape, and different connections between the standard and the vertical frame might be employed. Furthermore, the foot-rest frame might have a different shape, and, in general, the various elements may be modified while still retaining the same general mode of operation.

What I claim as new, and desire to secure by Letters Patent of the United States, is:

1. In a collapsible sulky, the combination with a seat frame, of a foot-rest frame pivotally supported from the seat frame and adapted to swing backward beneath the same in a line parallel to the axis thereof, a pair of wheel frames pivoted to the seat frame to swing thereunder, a back-rest frame pivoted to the seat frame and adapted to swing forward upon the frame, and means for locking the wheel frames, the foot-rest frame and the back-rest frame in either position.

2. In a collapsible sulky, the combination with a seat frame, of a foot-rest frame pivotally supported from the seat frame and adapted to swing backward beneath the same in a line parallel to the axis thereof, a pair of wheel frames pivoted to the seat frame to swing thereunder, a back-rest frame pivoted to the seat frame and adapted to swing forward upon the frame, and connections between the wheel frames, the foot-rest frame and the back-rest frame, whereby when the back-rest frame is moved either way the wheel frames and the foot-rest frame will be moved in the corresponding direction.

3. In a collapsible sulky, the combination with a seat frame, of a foot-rest frame pivotally supported from the seat frame and adapted to swing backward beneath the same in a line parallel to the axis thereof, a pair of wheel frames pivoted to the seat frame to swing thereunder, a back-rest frame pivoted to the seat frame and adapted to swing forward upon the frame, connections between the wheel frames, the foot-rest frame and the back-rest frame, whereby when the back-rest frame is moved either way the wheel frames and the foot-rest frame will be moved in the corresponding direction, and means for locking the wheel frames, the back-rest frame and the foot-rest frame in either position.

4. In a collapsible sulky, the combination with a seat frame, of a downwardly extending standard pivoted to the forward end of the seat frame, a foot-rest frame pivoted at its forward end to the standard and at its rear end pivotally supported from the seat frame, a pair of wheel frames pivoted to the seat frame to swing thereunder, a back-rest frame pivoted to the seat frame and adapted to swing forward upon said seat frame, and means for locking the wheel frames, the back-rest frame, the foot-rest frame and the standard in either position.

5. In a collapsible sulky, the combination with a seat frame, of a downwardly extending standard pivoted to the forward end of the seat frame, a foot-rest frame pivoted at its forward end to the standard and at its rear end pivotally supported from the seat frame, a pair of wheel frames pivoted to the seat frame to swing thereunder, a back-rest frame pivoted to the seat frame and adapted to swing forward upon said seat frame, and connections between the wheel frames, the foot-rest frame, the standard and the back-rest frame, whereby when the back-rest frame is moved either way, the wheel frames, the foot-rest frame and the standard will be moved in a corresponding direction.

6. In a collapsible sulky, the combination with a seat frame, of a downwardly extending standard pivoted to the forward end of the seat frame, a foot-rest frame pivoted at its forward end to the standard and at its rear end pivotally supported from the seat frame, a pair of wheel frames pivoted to the seat frame to swing thereunder, a back-rest frame pivoted to the seat frame and adapted to swing forward upon said seat frame, connections between the wheel frames, the foot-rest frame, the standard and the back-rest frame, whereby when the back-rest frame is moved either way, the wheel frames, the foot-rest frame and the standard will be moved in a corresponding direction, and means for locking the aforesaid movable frames and the standard in either position.

7. In a collapsible sulky, the combination with a seat frame, of a downwardly extending standard pivoted to the forward end of the seat frame, a foot-rest frame pivoted at its forward end to the standard and at its rear end pivotally supported from the seat frame, a pair of wheel frames pivoted to the seat frame to swing thereunder, a back-rest frame pivoted to the seat frame and adapted to swing forward upon said seat frame, a vertical arm-frame pivotally connected to the back-rest frame, the seat frame and the foot-rest frame, and means for locking all of said movable frames and the standard in either position.

8. In a collapsible sulky, the combination with a seat frame, of a downwardly extending standard pivoted to the forward end of the seat frame, a foot-rest frame pivoted at its forward end to the standard and at its rear end pivotally supported from the seat frame, a pair of wheel frames pivoted to the seat frame to swing thereunder, a back-rest frame pivoted to the seat frame and adapted to swing forward upon said seat frame, a vertical arm-frame pivotally connected to the back-rest frame, the seat frame and the foot-rest frame, and connections between the aforesaid movable frames and the standard, whereby when the back-rest frame is moved either way, the remaining movable frames and the standard will be moved in the corresponding direction.

9. In a collapsible sulky, the combination with a seat frame, of a downwardly extending standard pivoted to the forward end of the seat frame, a foot-rest frame pivoted at its forward end to the standard and at its rear end pivotally supported from the seat frame, a pair of wheel frames pivoted to the seat frame to swing thereunder, a back-rest frame pivoted to the seat frame and adapted to swing forward upon said seat frame, a vertical arm-frame pivotally connected to the back-rest frame, the seat frame and the foot-rest frame, connections between the aforesaid movable frames and the standard, whereby when the back-rest frame is moved either way, the remaining movable frames and the standard will be moved in the corresponding direction, and means for locking the aforesaid movable frames and standard in either position.

10. In a collapsible sulky, the combination with a seat frame, of a downwardly extending standard pivoted to the forward end of the seat frame, a foot-rest frame pivoted at its forward end to the standard, a pair of wheel frames pivoted to the seat-frame to swing thereunder, a back-rest frame pivoted to the seat frame and adapted to swing forward thereon, a vertical arm-frame pivotally connected to the back-rest frame, the seat frame and the foot-rest frame, a horizontal arm-frame pivoted to the back-rest frame and the vertical arm-frame, and means for locking the aforesaid movable frames and standard in either position.

11. In a collapsible sulky, the combination with a seat frame, of a downwardly extending standard pivoted to the forward end of the seat frame, a foot-rest frame pivoted at its forward end to the standard, a pair of wheel frames pivoted to the seat frame to swing thereunder, a back-rest frame pivoted to the seat frame and adapted to swing forward thereon, a vertical arm-frame pivotally connected to the seat frame and the foot-rest frame, a horizontal arm frame pivoted to the back-rest frame and the vertical arm-frame, and connections between the aforesaid movable frames and the standard, whereby when the back-rest frame is moved either way, the other movable frames and the standard will be moved in the corresponding direction.

12. In a collapsible sulky, the combination with a seat frame, of a downwardly extending standard pivoted to the forward end of the seat frame, a foot-rest frame pivoted at its forward end to the standard, a pair of wheel frames pivoted to the seat frame to swing thereunder, a back-rest frame pivoted to the seat frame and adapted to swing forward thereon, a vertical arm-frame pivotally connected to the seat frame and the foot-rest frame, a horizontal arm-frame pivoted to the back-rest frame and the vertical arm-frame, connections between the aforesaid movable frames and the standard, whereby when the back-rest frame is moved either way, the other movable frames and the standard will be moved in the corresponding direction, and means for locking the aforesaid movable frames and standard in either extreme position.

13. In a collapsible sulky, the combination with a seat frame, of a pair of wheel frames pivoted thereto to swing under the seat frame, a back-rest frame pivoted thereto and adapted to swing forward upon the seat frame, connections between the wheel frames and back-rest frame compelling the former to move with the latter from extended to collapsed position, and vice versa, a tongue pivoted to the forward end of the seat frame and adapted to be folded back on the collapsed sulky, over the back-rest frame and means for securing said tongue in said folded-back position to hold all the parts in their collapsed position.

14. In a collapsible sulky, the combination with a seat frame, of a foot-rest frame pivotally supported from the seat frame and adapted to swing backward beneath the same, a pair of wheel frames pivoted to the seat frame and adapted to swing thereunder, a back-rest frame pivoted thereto and adapted to swing forward upon the seat frame, connections between the wheel frames and back-rest frame compelling the former to move with the latter from extended to collapsed position, and vice versa, a tongue pivoted to the forward end of the seat frame and adapted to be folded back upon the collapsed sulky, over the back-rest frame and means for securing it in said folded-back position to hold all the parts in their collapsed position.

15. In a collapsible sulky, the combination with a seat frame, of a downwardly extending standard pivoted to the forward end of the seat frame, a foot-rest frame pivoted at its forward end to the standard and at its rear end pivotally supported from the seat frame, a pair of wheel frames pivoted to the seat frame to swing thereunder, a back-rest frame pivoted to the seat frame and adapted to swing forward upon said seat frame, connections between the wheel frames and back-rest frame compelling the former to move with the latter from extended to collapsed position, and vice versa, a tongue pivoted to the forward end of the seat frame and adapted to be folded back on the collapsed sulky, and means for securing it in said folded-back position to hold all the parts in their collapsed position.

16. In a collapsible sulky, the combination with a seat frame, of a downwardly extending standard pivoted to the forward end of the seat frame, a foot-rest frame pivoted at its forward end to the standard and at its rear end pivotally supported from the seat frame, a pair of wheel frames pivoted to the seat frame to swing thereunder, a back-rest frame pivoted to the seat frame and adapted to swing forward upon said seat frame, a vertical arm-frame pivotally connected to the back-rest frame, the seat frame and the foot-rest frame, said arm-frame coöperating with the wheel frames to move the latter with it to and from the collapsed position, a tongue pivoted to the forward end of the seat frame and adapted to be folded back on the collapsed sulky, and means for securing the tongue in said folded-back position to hold all the parts in their collapsed position.

17. In a collapsible sulky, the combination with a seat frame, of a downwardly extending standard pivoted to the forward end of the seat frame, a foot-rest frame pivoted at its forward end to the standard, a pair of wheel frames pivoted to the seat frame to swing thereunder, a back-rest frame pivoted to the seat frame and adapted to swing forward thereon, a vertical arm-frame pivotally connected to the seat frame and the foot-rest frame, said arm-frame coöperating with the wheel frames to move the latter with it to and from the collapsed position, a horizontal arm-frame pivoted to the back-rest frame and the vertical arm-frame, a tongue pivoted to the forward end of the seat frame and adapted to be folded back on the collapsed sulky, and means for securing it in said folded-back position to hold all the parts in their collapsed position.

18. In a collapsible sulky, the combination with a seat frame, of a pair of wheel frames pivoted thereto to swing under the seat frame, a back-rest frame pivoted thereto and adapted to swing forward upon the seat frame, connections between the wheel frames and the back-rest frame compelling them to move together in opening and collapsing, a tongue pivoted to the forward end of the seat frame and adapted to be folded back on the collapsed sulky, over the back-rest frame, and means for securing said tongue in said folded-back position to hold all the parts in their collapsed position, consisting of a catch pivoted on the forward end thereof and adapted to coöperate with the rear end of the seat frame.

19. In a collapsible sulky, the combination with a seat frame, of a pair of wheel frames pivoted thereto to swing under the seat frame, a back-rest frame pivoted thereto and adapted to swing forward upon the seat frame, a tongue pivoted to the forward end of the seat frame and adapted to be folded back on the collapsed sulky, and means for securing said tongue in said folded-back position, consisting of a catch pivoted on the forward end thereof and adapted to coöperate with the rear end of the seat frame, said tongue engaging and holding under tension the spring top portion of the back-rest frame.

20. In a sulky, the combination with a seat frame, of a tongue pivoted therein, a catch mounted on the pivoted end of the tongue coöperating with the front end of the seat frame, and a second catch pivoted on the free end of the tongue and coöperating with the rear end of the seat frame when the tongue is folded backward thereon.

21. In a sulky, the combination with a seat frame, of a tongue pivoted therein, a back-rest frame having a spring metal portion and foldable forward on the seat frame, and a catch pivoted on the forward end of the tongue and adapted to engage the rear portion of the seat frame to hold the tongue in its backward folded position, said tongue engaging the spring metal portion of the back-rest frame to keep the tongue under stress tending to throw it forward.

22. In a sulky, the combination with a seat frame, of a tongue pivoted in the forward end thereof, a catch carried by the pivoted end of the tongue and coöperating with the seat frame to hold it in its extended position, a back-rest frame having a spring metal portion and foldable forward on the seat frame, and a second catch pivoted on the outer end of the tongue and adapted to engage the rear end of the seat frame, said tongue coöperating with the spring metal portion of the back-rest frame so that it is held under a strain tending to throw the tongue forward.

23. In a collapsible sulky, the combination with a seat frame, of a pair of wheel frames pivoted thereto and adapted to swing under the seat frame, a foot-rest frame pivotally supported from the seat frame and adapted to swing backward beneath the same between it and the collapsed wheel frames, and means for locking the wheel frames and foot-rest frame in either position.

24. In a collapsible sulky, the combination with a seat frame, of a pair of wheel frames pivoted thereto and adapted to swing under the seat frame, a foot-rest frame pivotally supported from the seat frame and adapted to swing backward beneath the same between it and the collapsed wheel frames, and connections between the wheel frames and the foot-rest frame, whereby when the latter is moved either way the wheel frames will be moved in the corresponding direction.

25. In a collapsible sulky, the combination with a seat frame, of a pair of wheel frames pivoted thereto and adapted to swing under the seat frame, a downwardly extending standard pivoted to the forward end of the seat frame, a foot rest frame pivotally supported from the standard and seat frame and adapted to swing back beneath the latter between it and the collapsed wheel frames, and means for locking the wheel frames, the foot-rest frame and the standard in either position.

26. In a collapsible sulky, the combination with a seat frame, of a pair of wheel frames pivoted thereto and adapted to swing under the seat frame; a downwardly extending standard pivoted to the forward end of the seat frame, a foot-rest frame pivotally supported from the standard and seat frame and adapted to swing back beneath the latter between it and the collapsed wheel frames, and connections between the wheel frames, the foot-rest frame and the standard, whereby when the standard is moved either way the wheel frames will be moved in the corresponding direction.

27. In a collapsible sulky, the combination with a main frame, of a pair of wheel-frames pivoted thereto and adapted to swing under the main frame, a vertical frame pivotally supported from the main frame adjacent the wheel-frames, a downwardly extending standard pivoted to the forward end of the main frame, a foot-rest frame pivotally connected at its forward end to the standard and at its rear end to the vertical frame and adapted to swing back beneath the main frame and between it and the wheel-frames, and connections between the wheel-frames, the foot-rest frame and the standard, whereby when the standard is moved in either direction the wheel-frames will be moved in the corresponding direction.

28. In a collapsible vehicle, the combination with a main frame, of a pair of wheel-frames pivoted to the rear half thereof and adapted to swing under the main frame, a back-rest frame pivoted to and above the rear part of the main frame, a vertical frame pivoted to the main frame and depending therefrom in the planes of the wheel-frames so that the swinging of the vertical frame in one direction collapses the wheel frames, and in the other extends them, connections between the vertical frame and the back-rest frame so that the latter is folded forward on the main frame as the wheel-frames are collapsed, a second vertical frame depending from the forward portion of the main frame, connections between said two vertical frames so that they swing together in collapsing and extending the vehicle, and means for locking the parts in their collapsed position.

29. In a collapsible vehicle, the combination with a main frame, of a pair of wheel-frames pivoted to the rear half thereof and adapted to swing under the main frame, a back-rest frame pivoted to and above the rear part of the main frame, a vertical frame pivoted to the main frame and depending therefrom in the planes of the wheel-frames so that the swinging of the vertical frame in one direction collapses the wheel-frames, and in the other extends them, connections between the vertical frame and the back-rest frame so that the latter is folded forward on the main frame as the wheel-frames are collapsed, a second vertical frame depending from the forward portion of the main frame, connections between said two vertical frames so that they swing together in collapsing and extending the vehicle, a tongue pivoted to the forward end of the main frame and adapted to be folded back thereon over the collapsed back-rest frame, and catch mechanism between the tongue and the main frame to hold the tongue in position to lock all the parts in their collapsed position.

30. In a collapsible vehicle, the combination with a main frame, of a pair of wheel-frames pivoted to the rear half thereof and adapted to swing under the main frame, a back-rest frame pivoted to and above the rear part of the main frame, a vertical frame pivoted to the main frame and depending therefrom in the planes of the wheel-frames so that the swinging of the vertical frame in one direction collapses the wheel frames and in the other extends them, connections between the vertical frame and the back-rest frame so that the latter is folded forward on the main frame as the wheel-frames are collapsed, a second vertical frame depending from the forward portion of the main frame, connections between said two vertical frames so that they swing together in collapsing and extending the vehicle, a tongue pivoted to the forward end of the main frame and adapted to be folded back thereon over the collapsed back-rest frame, a catch between the seat-frame and tongue to hold the latter in its extended position, and catch mechanism between the tongue and the main frame to hold the tongue in position to lock all the parts in their collapsed position.

31. In a collapsible vehicle, the combination with a main frame, of a wheel-frame pivoted thereto to swing from extended to collapsed position and vice versa, a seat associated with the main frame, a back-rest frame pivoted relative to the main frame and adapted to be folded down over the same when the sulky is collapsed and swung up at right angles thereto when it is extended, connections between the back-rest frame and the wheel-frame to compel their simultaneous movement to and from the collapsed position, a tongue pivoted in the forward end of the main frame and foldable over lengthwise thereof onto the collapsed back-rest frame, and catch mechanism between the tongue and the main frame to hold the tongue in its folded-back position, thereby securing all the parts in their collapsed position.

32. In a collapsible vehicle, the combination with a main frame, of a wheel-frame pivoted thereto to swing from extended to collapsed position and vice versa, a seat associated with the main frame, a back-rest frame pivoted relative to the main frame and adapted to be folded down over the same when the sulky is collapsed and swung up at right angles thereto when it is extended, connections between the back-rest frame and the wheel-frame to compel their simultaneous movement to and from the collapsed position, a tongue pivoted in the forward end of the main frame and foldable over lengthwise thereof onto the collapsed back-rest frame, catch mechanism between the tongue and the main frame to hold the tongue in its folded-back position, thereby securing all the parts in their collapsed position, and a catch between the pivoted end of the tongue and the adjacent end of the seat-frame to lock it down in its extended position.

33. In a collapsible vehicle, the combination with a main frame, of a pair of wheel-frames pivoted to the rear half thereof and adapted to swing under the main frame, a vertical frame pivoted to and above the rear part of the main frame, a second vertical frame pivoted to the main frame and depending therefrom in the planes of the wheel-frames so that swinging of the vertical frame in one direction collapses the wheel-frames and in the other extends them, connections between the two vertical frames so that the first is folded forward on the main frame as the wheel-frames are collapsed, a standard depending from the forward portion of the main frame, connections between the standard and the downwardly depending vertical frame so that they swing together in collapsing and extending the vehicle, and means for holding said parts in their collapsed and extended positions.

34. In a collapsible vehicle, the combination with a main frame, of a pair of wheel-frames pivoted to the rear half thereof and adapted to swing under the main frame, a vertical frame pivoted to and above the rear part of the main frame, a second vertical frame pivoted to the main frame and depending therefrom in the planes of the wheel-frames so that swinging of the vertical frame in one direction collapses the wheel-frames and in the other extends them, connections between the two vertical frames so that the first is folded forward on the main frame as the wheel-frames are collapsed, a standard depending from the forward portion of the main frame, connections between the standard and the downwardly depending vertical frame so that they swing together in collapsing and extending the vehicle, a tongue pivoted to the forward end of the main frame and adapted to be folded back thereon over the collapsed first-named vertical frame, and automatic mechanism for the tongue to hold it in position to lock all the parts in their collapsed position.

35. In a collapsible vehicle, the combination with a main frame, of a wheel-frame pivoted thereto to swing from extended to collapsed position and vice versa, a vertical frame pivoted at the rear of the main frame and adapted to be folded down over the same when the sulky is collapsed and swung up at right angles thereto when it is extended, connections between the vertical frame and the wheel-frame to compel their simultaneous movement to and from the collapsed position, a tongue pivoted in the forward end of the main frame and foldable over lengthwise thereof onto the collapsed vertical frame, and catch mechanism to hold the tongue in its folded-back position, thereby securing all the parts in their collapsed position.

36. In a child's sulky, a support which prevents the vehicle from tilting too far, wheel-supports, a seat, a seat-back, and means interconnected with said supports and seat-back for folding all of said supports and said seat-back into substantially parallel relation with the seat.

37. In a child's sulky, a support which prevents the vehicle from tilting too far, wheel-supports, a seat, a back and side-arms for the seat, and means connected with said supports, back, and side-arms for simultaneously folding said supports and said back and side-arms into substantially parallel relation with the seat.

In witness whereof, I have hereunto set my hand and affixed my seal, this 2nd day of October A. D. 1911.

RHINEHARDT H. BROWN. [L. s.]

Witnesses:
 JOHN HOWARD MCELROY,
 MILDRED ELSNER.

---

Copies of this patent may be obtained for five cents each, by addressing the "Commissioner of Patents, Washington, D. C."